A gaging head having a central bore to permit the passage of pressurized air therethrough and being connected by passages to opposite longitudinal surface slots provided on the gaging head. A feeler blade is carried in each of the slots and is adapted to contact the internal surface of the bore in the workpiece upon introduction of pressurized air into the gaging head. The outer ends of the feeler blades are mounted in the gage head in a manner which permits only limited outward movement. Pins are fitted into the outer end of the feeler blades which pins extend into channels provided in the longitudinal slots. The movement of the feeler blade assembly is limited by the distance the pins can move in the channels.

United States Patent
Goodenough

[15] 3,646,685
[45] Mar. 7, 1972

[54] GAGING HEAD FOR PNEUMATIC BORE GAGING DEVICES

[72] Inventor: Walter E. Goodenough, Detroit, Mich.
[73] Assignee: Etronic Corporation, Detroit, Mich.
[22] Filed: July 10, 1969
[21] Appl. No.: 840,620

[52] U.S. Cl. ................................................33/143, 33/178
[51] Int. Cl. .....................................G01b 5/00, G01b 13/08
[58] Field of Search .................................33/DIG. 2, 178 A

[56] References Cited

UNITED STATES PATENTS 2,590,170  3/1952  Gates .........................................33/178
2,623,294  12/1952  Fox ...........................................33/178

Primary Examiner—Leonard Forman
Assistant Examiner—A. J. Mirabito
Attorney—Hauke, Gifford and Patalidis

[57] ABSTRACT

9 Claims, 5 Drawing Figures

INVENTOR
WALTER E. GOODENOUGH
BY Hauke, Gifford, & Patalidi
ATTORNEYS

GAGING HEAD FOR PNEUMATIC BORE GAGING DEVICES

BACKGROUND OF THE INVENTION

1. Field of the Invention

The present invention relates to gaging devices and more particularly to an air gaging device for determining whether or not bores in workpieces are within desired limits.

2. Description of the Prior Art

Pneumatic gages in which the airflow between a predetermined size gage head and the internal surface of the bore is measured to determine the clearance between the gage head and the internal surface of the bore are well known in the art. Such gages usually comprise a head in the shape of a cylindrical probe provided with an internal fluid conduit with which a source of fluid pressure is connected. One or more longitudinal grooves in the peripheral surface of the probe are in communication with the fluid conduit to normally exhaust air pressure therethrough. The relative size and length of the peripheral groove or grooves is chosen such that when the probe is inserted in the bore of the workpiece a normal back pressure is created in the conduit of the probe. The pressure created upon insertion of the probe into the bore is utilized to indicate whether or not the bore is within the desired tolerances.

Gaging devices which utilize the clearance space between the air pressure exhaust groove and the internal surface of the workpiece being measured for airflow restricting purpose to create and indicate back pressure are not altogether reliable or precise. These gaging devices are normally sufficient only for gaging variations in diameter of about three to four thousandths of an inch. For greater variations such devices are quite unreliable.

Additionally, in close tolerance precision boring jobs it might be necessary to determine the relative roughness of the internal surface of the bore. Machined surfaces have peaks and valleys of microscopic degrees and, if these are relatively small as in well-polished or lapped surfaces, the conventional gaging devices are still sufficiently dependable to produce a true diameter reading. However, with an increase in surface roughness, conventional gaging devices become less dependable because of the utilization of the clearance space between the gage probe and the internal surface to be measured for restricting airflow to create a back pressure, since generally speaking such devices really only measure the space between the gage probe and a point intermediate the peaks and valleys of the internal surface.

In order to overcome the foregoing problem, gage heads or probes have been proposed which are provided with one or more independently radially movable feeler members adapted to contact the internal surface of the bore of the workpiece and which have a surface in direct line with the opening or openings of the air conduit. The feeler members then effectively throttle or control airflow from the conduit of the probe to the exhaust passage to cause the creation of a back pressure of a magnitude in direct relation to the spacing of the opening between feeler member and the conduit, and this spacing continuously varies in accordance with the roughness of the surface or the inaccuracy of the bore. Thus, by eliminating the dependency on governing airflow directly between the probe and the surface of the bore a far more accurate measurement can be obtained since the probe makes a mechanical contact with the surface by means of the independently movable feeler members which precisely follow the peaks and valleys of the machined surface and thereby the airflow through the exhaust passage is constantly changed.

The feeler members in the known gaging devices are usually in the form of inherently resilient blades or spring-loaded inserts adapted to move a limited distance radially outwardly from the periphery of the probe into contact with the surface to be measured.

Serious problems have been encountered in the past by these types of feelers. Periodically, it will happen that the feelers get stuck in the peripheral recess in the probe so as not to be able to move outwardly due to the collection of dirt and grime between the feeler blades and the surface of the retaining recess, or for other reasons. If this occurs, it happens frequently by trying to pry the feeler blades loose, the feeler blade will be broken. Thus, a frequent replacement of broken or otherwise damaged feeler blades has been necessary in the heretofore known probe-type air gaging devices.

SUMMARY OF THE PRESENT INVENTION

The present invention provides novel means to eliminate the foregoing disadvantages of known air gaging devices having a probe and independently movable feeler blades. The improved gage head comprises a cylindrical probe having an air conduit adapted for connection to a source of pressurized air. The air conduit has openings which extend radially towards the surface of the probe to be in communication with exhaust passages. Independently movable feeler members in the form of blades are resiliently supported in longitudinal recesses or slots on the peripheral surface of the probe in a position to throttle the airflow from the conduit through the exhaust passages to thereby create a backflow pressure which varies depending upon the position of the feeler blades. The feeler blades are securely attached within the longitudinal slots and are provided with a resiliently movable head portion having an external block insert for contact of the feeler blades with the surface of the bore. The head portion is retained on the probe for limited movement relative thereto by means of a pin retained in appropriate channels formed along opposite sides of the longitudinal slot. The channels are of such width as to permit limited radial outward movement of the feeler blades relative to the peripheral surface of the probe but to effectively prevent the feeler blades from being pried upwardly or broken off in case the feeler blade has to be loosened when stuck in the slot.

Further distinct advantages and novel features will become evident or will be particularly pointed out in the following detailed description by reference to the attached drawings.

BRIEF DESCRIPTION OF THE DRAWINGS

The accompanying drawings illustrate in detail a preferred embodiment of the present invention, in which.

DESCRIPTION OF THE PREFERRED EMBODIMENT

Figures 1, 2, 3, 4, 5:
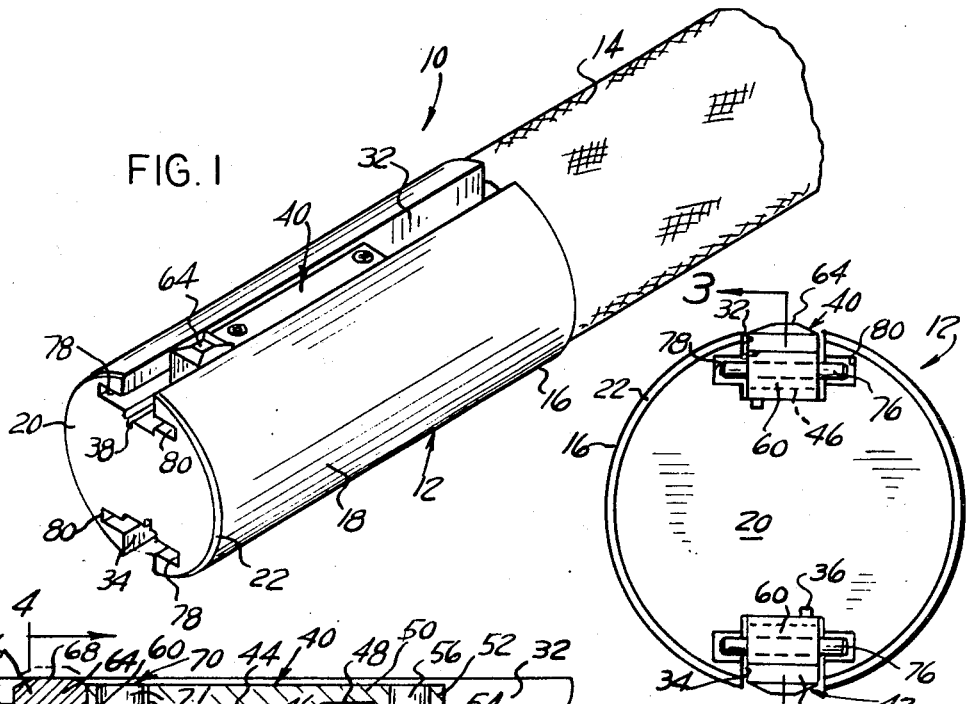
FIG. 1 is a perspective illustration of the present novel gaging head assembly.
FIG. 2 is a front plan view of the gaging head assembly as shown in FIG. 1.
FIG. 3 is an enlarged longitudinal central cross section through the feeler blade portion of the gaging head as seen along line 3—3 of FIG. 2.
FIG. 4 is a still further enlarged fragmentary cross section through the front portion of one of the feeler blade assemblies shown in FIG. 3 and as seen along line 4—4 thereof.
FIG. 5 is another longitudinal cross section through the gaging head assembly as seen along line 5—5 of FIG. 3.

With particular reference to FIG. 1, the improved gaging head assembly 10 of the present invention is composed generally of a cylindrical member 12, referred to as the probe, the rear portion of which is connected to an air supply conduit 14, which as is the general practice is connected to a source of pressurized air (not shown) at a constant pressure. The probe 12 is adapted to be inserted into a bore of a workpiece having an internal diameter substantially corresponding to the diameter of the probe for diametrical measurement of the bore surface. As will be subsequently described in detail, one or more escape passages are provided in the probe 12 between the air conduit and a corresponding number of resilient feeler members supported by the probe so that the flow of air under constant pressure directed through the probe and out through the air escape passages can take place a rate of flow determined by the size of the opening of the escape passages. The corresponding rate of flow of fluid or back pressure is then subsequently converted by means of appropriate instruments to signals for transference to an indicator instrument as is conventional practice.

With reference now to FIGS. 2 to 5, the probe 12 of the gaging head assembly comprises a substantially solid cylindrical body portion 16 having a smooth peripheral outer surface 18 and a flat front surface 20 provided with a circumferential chamfer 22 to facilitate the insertion of the probe into the bore of a workpiece.

As seen in FIG. 3, the probe 12 is provided with an axial longitudinal bore 24 which is in communication with the air conduit 14 for passage of pressurized air therethrough and which terminates short of the front end 20 of the probe to branch off into appropriate transverse passages 26 and 28, which extend in a direction toward the periphery of the probe. Each of the transverse passages 26 and 28 exit at the bottom surface 30 of diametrically oppositely disposed longitudinal slots or grooves 32 and 34 respectively, which intersect the peripheral surface 18 of the probe. As particularly shown in FIG. 5, the bottom 30 of each of the slots 32 and 34 is provided with a circumferential groove 36 disposed around the exit of each of the transverse passages 26 and 28. Each of the circumferential grooves 36 is in communication with a respective passage 38 which extends longitudinally of the probe to exit at the front face 20 to thereby provide a restricted air escape means for the pressurized air passing from the conduit 14 through the bore 24 into the passages 26, 28, as will be more fully explained hereafter.

Each of the longitudinal slots 32, 34 retains a feeler blade assembly 40, 42, which, as is known in the art, provides the actual surface contact means for measuring the diameter of the bore. Each of the feeler blade assemblies 40, 42 comprises a longitudinal body portion 44 which is provided at its underside with a recess 46 intermediate its ends and opposite the bottom surface 30 of the slots 32, 34. The rear end of the recess 46 of each of the feeler blades 40, 42 expands into a relatively deep cutout 48 providing a bridging portion 50 of relatively thin cross section between the main body portion 44 and the rear end 52 of the feeler blades 40, 42, so as to permit the main body portion 44 to flex in cantilever fashion relative to the rear end 52.

The lower surface 54 of the rear end 52 of each of the feeler blades 40, 42 is preferably rearwardly upwardly inclined from adjacent the rear end of the cutouts 48 and the rear end of each of the feeler blades is rigidly secured to the bottom of the slots 32, 34 respectively by means of fasteners 56 threaded into appropriate apertures 58 in the bottom 30 of the slots 32, 34. The slightly inclined surfaces 54 at the rear of the feeler blades aid to reduce undesirable bending stresses at the bridging portion 50 upon flexing of the main body portion 44 of the feeler blades during operation of the probe 12.

The front end 60 of each of the feeler blades 40, 42 is provided with a flat bottom surface 62, which, in assembly, normally flatly abuts upon the bottom surface 30 of the slots 32, 34. As particularly shown in FIG. 3, the flat bottom surface 62 of the front ends of the feeler blades normally cover the exit of the passages 26, 28 as well as the circumferential grooves 36 associated therewith so as to close off the air escape passages 38. The front ends 60 of the feeler blades are each provided with a block insert 64 at the top thereof which preferably is made of a wear-resistant tool material such as, for instance, tungsten carbide, and the upper surface of which is shaped to provide an apex portion 66 having a radial surface 68. The radial surface 68, when the front ends of the blades 40, 42 are down on the bottom surface 30 of the slots 32, 34, corresponds to the radius of the peripheral surface 18 of the body portion of the probe, as indicated by the dot and dash lines in FIG. 4. Adjacent the insert 64 and towards the rear thereof, the feeler blades are secured by another fastener 70 to the body portion 16 of the probe. The front fastener 70 extends through an aperture 72 provided rearwardly of the insert 64 and intersects the recess 46. The head 71 of the fastener extends into a counterbore 73 of the aperture 72. Both the aperture 72 and the counterbore 73 are slightly larger in diameter than the fastener 70 so as to permit unrestricted movement of the feeler blade radially outwardly of the probe. The front fastener 70 is subsequently adjustably secured within a threaded aperture 74 in the body portion 16 of the probe to thereby adjustably control the radial outward movement of the front end 60 of the feeler blade in accordance with the surface condition of the bore to be measured.

In accordance with the improvement of the present invention, the front end 60 of each of the feeler blades 40, 42 is restrained against unlimited movement radially outwardly of the slots 32, 34 by means of a pin or arbor 76 which is rigidly secured to the front end of the feeler blade and which extends transversely through the front end of the feeler blades and out of the opposite sides as clearly shown in FIGS. 2 and 4. The opposite ends of the arbors 76 extend into opposite transverse slots or channels 78, 80, which communicate with the axial slots 32, 34 along an axis "X" which is normal to the axis "X1" of the slots 32, 34 as shown in detail in FIG. 4.

With particular reference to FIG. 4, the arbor retaining slots or channels 78, 80 are of larger width than the diameter of the arbor 76 permitting a limited radial movement of the feeler blades outwardly of the probe and beyond the peripheral surface 18 of the probe a distance indicated by the arrow "D" in FIG. 4. However, further movement radially outwardly of the probe 12 is prevented by the restriction of the transverse channels 78, 80 which prevent a complete disengagement of the feeler blades from the probe 12, by limiting the radial outward movement of the front end of the feeler blades to the distance "D" provided by the dimension of the transverse channels 78, 80. The distance "D" is sufficient to gage any bore of a size corresponding substantially to the diameter of the probe 12.

Thus, in accordance with the present invention, when either or both of the feeler blades 40 or 42 should become stuck in its respective slot 32 or 34 prying it upwardly to loosen the blade will not tend to break it off since the radial outward movement of the blades is restricted by the movement of the arbor 76 within the transverse channels 78, 80 thereby removing a serious drawback of conventional feeler-type air gages.

As can best be seen in FIG. 1, the transverse channels 78 and 80 are coextensive with their respective slots 32 and 34 and open to the flat front surface 20. When it is desired to remove either or both of the feeler blades 40 or 42, the fasteners 56 and 70 are removed from their respective bores and the feeler blades 40 and 42 are withdrawn axially along their respective slots 32 or 34 to the front surface 20. Since each of the pins or arbors 76 is rigidly secured to each of the feeler blades 40 and 42, the pins 76 travel axially with the feeler blades within their respective channels 78 and 80 to the front face 20, thereby permitting easy withdrawal and/or insertion of the feeler blades within their respective slots 32 and 34 without the necessity of first removing the pins 76.

In operation of the present improved device, the probe 12 is inserted in a bore of a workpiece (not shown) and pressurized fluid under constant pressure is introduced through the conduit 14 into the central bore 24 of the probe and from there into the opposite branch passages 26, 28. The pressurized fluid exerts a force on the bottom surface 62 of the front ends 60 of both of the feeler blades 40, 42 causing a radial outward movement of the front ends 60 of the main body portion 44 of the feeler blades beyond the peripheral surface 30 of the probe as indicated by the dotted lines in FIG. 3 to make contact with the varying diametrical surface dimensions of the bore in which the probe is inserted. As described before, radial outward movement of the front end of the feeler blades is permitted by the resilient bridge portion 50 near the rear end of the feeler blades in conjunction with the clearance provided around the front fasteners 70. The radial outward movement of the feeler blades 40, 42 due to the force exerted by the pressurized fluid causes the exits of the transverse fluid passages 26, 28 to be opened to an extent corresponding to the outward movement of the front end of the feeler blades to thereby permit a restricted escape of the pressurized fluid along the escape passages 38. Due to the restricted rate of flow from the passages 26, 28 to the escape passages 38, a pressure differential or back pressure is created which is picked up by the instrumentation of the gaging device (not shown) as previously explained for recording on a visual indicating means. The resilient bridge portion 50 of the feeler blades allows flexible cantilever fashion movement of the front end 60 of the feeler blades radially outwardly of the probe in accordance with the surface condition of the bore being measured. It is this portion of the blade which is most often broken upon prying upwardly of the blades and it is this portion that is protected by the present invention.

Depending on the tolerance allowances, surface smoothness and other related factors of the bore to be measured, the extent of radial displacement of the feeler blades outwardly of the probe can be accordingly adjusted by manipulation of the front fasteners 70 in or out of the body portion 16 of the probe to thereby limit the radial movement of the feeler blades.

In accordance with the improvement of the present invention, if the feeler blades 40 and/or 42 should become stuck in the respective slots 32, 34 and an attempt is made to pry them loose by a screwdriver or the like the danger of breaking the blades is substantially reduced since the pry-off movement is limited by the width of the arbor channels 78, 80. The width of the channels 78, 80 is designed to permit sufficient radial displacement of the front end of the feeler blades to make the appropriate measurements.

Thus, it will be evident from the foregoing disclosure that the present invention provides an improved gaging head assembly for an air gage device employing separately movable feeler blades for direct surface contact measurement which are prevented from being accidentally broken and dislodged from their retaining slots on the gaging head by which means nevertheless permits maximum bore measurement adjustment in accordance with the degree of surface roughness of the bore.

Having thus described my invention, I claim:

1. In combination with a pneumatic gaging device for measurement of internal surfaces of a workpiece, a gaging head assembly comprising:
   a cylindrical body having a central bore in communication with a source of pressurized fluid,
   said cylindrical body being provided with at least one longitudinal slot in its periphery, said slot being open at least at one end of said body,
   said central bore having an exit passage intersecting said longitudinal slot,
   a feeler blade assembly positioned in said slot and rigidly secured therein at one end, the other end of said feeler blade assembly having a surface normally closing said exit passage,
   a block insert on said feeler blade assembly opposite said surface adapted for contact with said internal surface of said workpiece,
   said feeler blade assembly being adapted to flex radially outwardly beyond the periphery of said cylindrical body upon introduction of pressurized fluid through said central bore to vary the degree of opening of said exit passage to provide a restricted fluid escape flow therethrough corresponding to the degree of opening of said exit passage, and
   means carried at the free end of said feeler blade assembly to limit outward movement thereof, said means comprising a recess extending laterally from each side of said longitudinal slot and coextensive with said longitudinal slot up to and including said open end and means extending from the free end of said feeler blade and into said recess comprising a pin secured in the other end of said feeler blade assembly and extending outwardly thereof to provide opposite arbor means for extension into said recess to prevent said feeler blade assembly from being dislodged from said longitudinal slot.

2. In the combination as defined in claim 1, said recess being of a width to permit limited radial movement of said arbors.

3. In the combination as defined in claim 1, in which said feeler blade assembly is provided with a portion of reduced cross section adjacent said rigidly secured end to permit flexing of said other end of said feeler blade in cantilever fashion upon introduction of pressurized fluid into said central bore of said cylindrical body.

4. A gaging head assembly for a pneumatic gaging device for measuring the size of an opening in a workpiece, said assembly comprising:
   a probe having a body portion adapted for insertion into said opening and provided with at least one longitudinal slot in the periphery thereof and opening to at least one end of said body portion;
   a feeler blade positioned in said slot and having one end mounted to said body portion, the other end of said feeler blade being a free end;
   means for introduction of pressurized fluid into said probe, said means including a fluid escape passage in the path of the free end of the feeler blade to permit said pressurized fluid to exert a force of said free end of said feeler blade to move said free end of said feeler blade outwardly to thereby open said fluid escape passage and permit a restricted flow of fluid therethrough; and
   means providing engagement between the free end of said feeler blade and said body and limiting outward movement thereof, said means comprising a recess extending laterally from and coextensive with said longitudinal slot; up to and including said open end of said longitudinal slot; and
   means carried by and extending from the free end of said feeler blade and into said recess, comprising a pin secured within said free end of said feeler blade and extending outwardly thereof to provide opposite arbor means for extension into said recess to thereby prevent said feeler blade from being dislodged from said longitudinal slot.

5. A gaging head assembly as defined in claim 4, further providing a second longitudinal slot disposed diametrically opposite the first-mentioned slot, said second slot also having a feeler blade positioned therein, a fluid escape passage connected to said fluid introduction means, an opening connected with the fluid escape passage and in the path of the free end of the second-mentioned feeler blade, and means limiting outward movement of the free end of said second mentioned feeler blade.

6. A gaging head assembly as defined in claim 5, and in which said limiting means comprises a recess extending laterally from and coextensive with said second slot, means carried by and extending through the free end of said second-mentioned feeler blade and into said second-mentioned recess, comprising a pin secured within said free end of said feeler blade and extending outwardly thereof to provide opposite arbor means for extension into said recess to thereby prevent said feeler blade from being dislodged from said longitudinal slot.

7. In the gaging head assembly as defined in claim 4, in which said free end of said feeler blade is provided with an insert adapted for contact with the surface of said opening in said workpiece, said insert having an outer surface normally coinciding with the periphery of said probe when said feeler blade is in contact with the bottom of said slot.

8. In the gaging head assembly as defined in claim 4, said feeler blade comprising a portion of reduced cross section adjacent the rigidly secured end of said feeler blade.

9. In the gaging head assembly as defined in claim 4, said means for introduction of pressurized fluid into said probe comprising a central bore within said probe in communication with a source of pressurized fluid, said escape passage being connected to said bore and opening into said longitudinal slot, said free end of said feeler blade having a flat surface extending across said opening and normally abutting upon the bottom of said slot to thereby close said opening.